United States Patent
Kim et al.

(10) Patent No.: US 7,623,190 B2
(45) Date of Patent: Nov. 24, 2009

(54) LCD DEVICE HAVING COMMON LINE EXTENSION AND GATE LINE RECESS OF EQUAL AREAS

(75) Inventors: Woo Hyun Kim, Seoul (KR); Eui Tae Kim, Seoul (KR); Sung Soo Chang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 602 days.

(21) Appl. No.: 11/299,658

(22) Filed: Dec. 13, 2005

(65) Prior Publication Data
US 2007/0002193 A1    Jan. 4, 2007

(30) Foreign Application Priority Data
Jun. 29, 2005    (KR) .................. 10-2005-0056917

(51) Int. Cl.
*G02F 1/1343*    (2006.01)
(52) U.S. Cl. ............................. 349/39; 349/38; 349/139
(58) Field of Classification Search .................. 349/38, 349/39
See application file for complete search history.

(56) References Cited

U.S. PATENT DOCUMENTS

| | | | | |
|---|---|---|---|---|
| 5,943,106 | A * | 8/1999 | Sukenori et al. | 349/39 |
| 6,590,550 | B2 * | 7/2003 | Nakayama et al. | 345/87 |
| 2004/0109118 | A1 * | 6/2004 | Kim et al. | 349/139 |

* cited by examiner

*Primary Examiner*—Andrew Schechter
(74) *Attorney, Agent, or Firm*—Morgan Lewis & Bockius LLP (57) ABSTRACT

A liquid crystal display (LCD) device includes a first substrate, gate lines formed on the first substrate, data lines perpendicularly crossing the gate lines to define red, green, and blue (R/G/B) sub-pixels, thin film transistors (TFTs) disposed at each intersection where the gate lines cross the data lines, common lines disposed in parallel with the gate lines, the common lines including a common line capacitance (Cdc) control portion, pixel electrodes insulated from the common lines and connected to the TFTs, a second substrate opposite to the first substrate and bonded to the first substrate, and a liquid crystal layer disposed between the first and second substrates.

3 Claims, 6 Drawing Sheets

LCD DEVICE HAVING COMMON LINE EXTENSION AND GATE LINE RECESS OF EQUAL AREAS

This application claims the benefit of the Korean Patent Application No. P2005-56917, filed on Jun. 29, 2005, which is hereby incorporated by reference as if fully set forth herein.

BACKGROUND OF THE INVENTION

1. Field of the Invention

The present invention relates to a liquid crystal display (LCD) device, and more particularly, to an LCD device that prevents picture quality from deteriorated by distortion of a common voltage.

2. Discussion of the Related Art

Recently, active matrix LCD devices have been widely incorporated into flat panel TVs, portable computers, monitors, and other electronic applications as their performance have been improved. Among the active matrix LCD devices, a twisted nematic (TN) mode LCD device is mainly used. The TN mode LCD device drives a liquid crystal director twisted at an angle of 90° by applying a voltage to electrodes arranged on two substrates. The TN mode LCD device provides excellent contrast and color reproduction but suffers from a narrow viewing angle.

To solve the narrow viewing angle problem of the TN mode LCD device, an in-plane switching (IPS) mode LCD device has been developed. In the IPS mode LCD device, two electrodes are formed on one substrate and a liquid crystal director is controlled by the IPS mode generated between the two electrodes. The IPS mode LCD device provides a wide viewing angle but suffers from low aperture ratio and transmittance of light.

To improve the low aperture ratio and transmittance of the IPS mode LCD device, a fringe field switching (FFS) mode LCD device has been developed. In the FFS LCD device, a counter electrode and a pixel electrode are formed of transparent conductors, and the distance between the counter electrode and the pixel electrode is maintained at a narrow range to drive liquid crystal molecules using a fringe field formed between the counter electrode and the pixel electrode.

Figure 1:
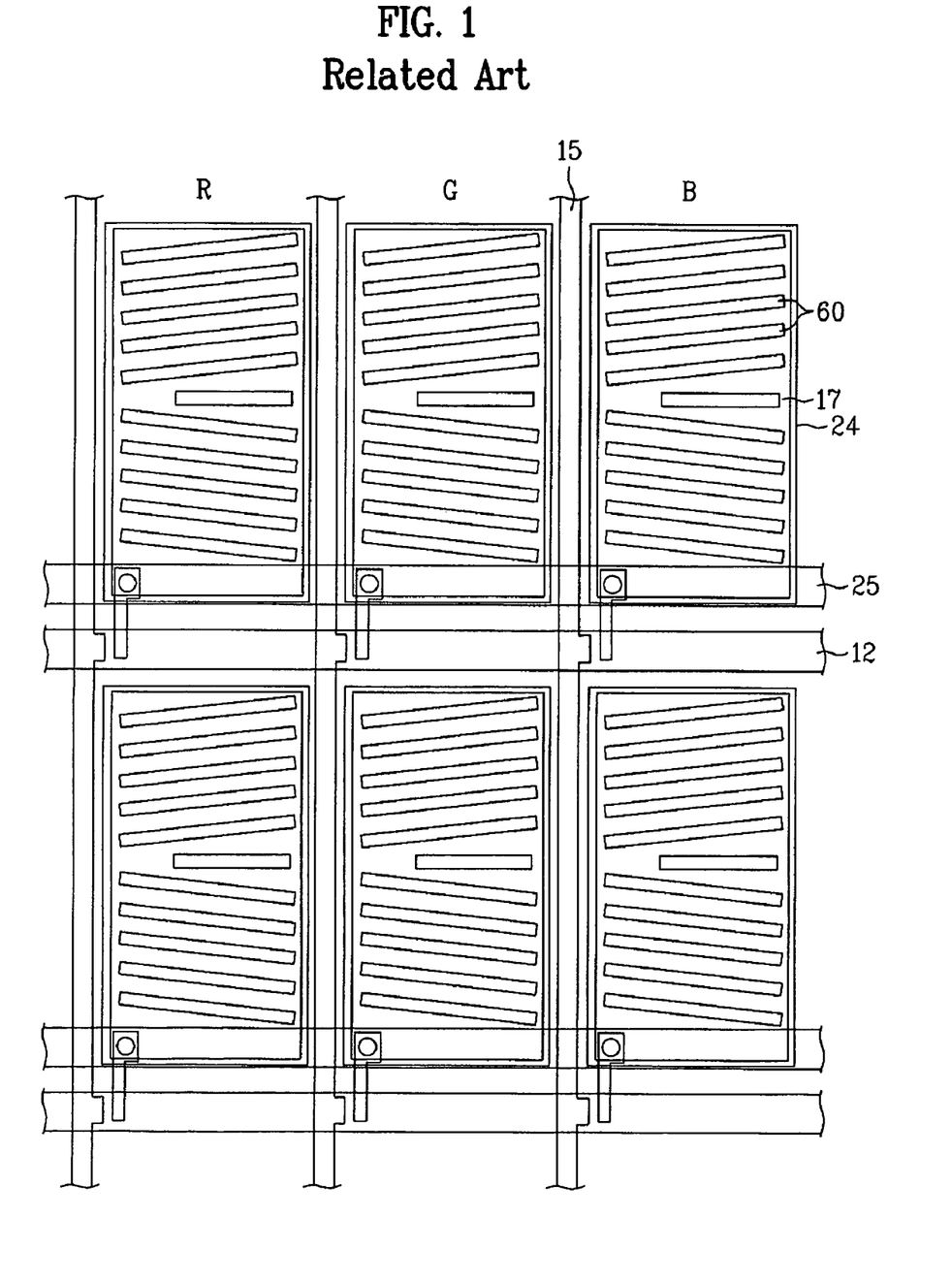
FIG. 1 is a plane view illustrating a related art fringe field switching (FFS) mode liquid crystal display (LCD) device.

An FFS mode LCD device of the related art includes a color filter array substrate provided with color filter layers, and a thin film transistor array substrate provided with thin film transistors (TFTs), counter electrodes and pixel electrodes. The color filter array substrate and the TFT array substrate are bonded to each other with a liquid crystal layer therebetween. The TFT array substrate, as shown in FIG. 1, includes gate lines 12, data lines 15, TFTs at each intersection of the gate line 12 and data line 15, common lines 25, plate type counter electrodes 24, and pixel electrodes 17. The gate lines 12 and the data lines 15 are formed of opaque metal. The gate lines 12 perpendicularly cross the data lines 15 to define sub-pixels. Each of the TFTs switches on/off a voltage at each crossing point between the respective gate and data lines 12 and 15. The counter and pixel electrodes 24 and 17 are formed of transparent metal, insulated from each other by an insulating layer and overlapped with each other in the pixels. The counter electrode 24 contacts the common lines 25 to receive common signals (Vcom) from the common lines 25.

More specifically, each counter electrode 24 is formed of plate type transparent metal. Each pixel electrode 17 is provided with a plurality of slits 60 symmetrical to one another around a center portion of a pixel region. A fringe field occurs between the counter electrode 24 and the pixel electrode 17 when voltage is applied to the electrodes. In particular, the signal Vcom is transmitted to the counter electrode 24 and a pixel voltage passing through the TFT is transmitted to the pixel electrode 17.

Each of the slits 60 typically has a width of 2 μm to 6 μm. Liquid crystals are driven by the fringe field formed between the pixel electrode 17 and the counter electrode 24. That is, the liquid crystals initially aligned by rubbing in a direction when there is no voltage are rotated by the fringe field to transmit light therethrough.

The color filter array substrate includes red, green, and blue (R/G/B) color filter layers (not shown) arranged at constant intervals to display colors. A black matrix layer serves to divide R/G/B cells from one another and shield aberrant light. The respective color filter layers are formed to correspond to the sub-pixels so that each of the sub-pixels has one color. Conventionally, pixels having R/G/B colors are arranged and independently driven. A color of one pixel is displayed by combination of the R/G/B color of the sub-pixels.

Figure 2:
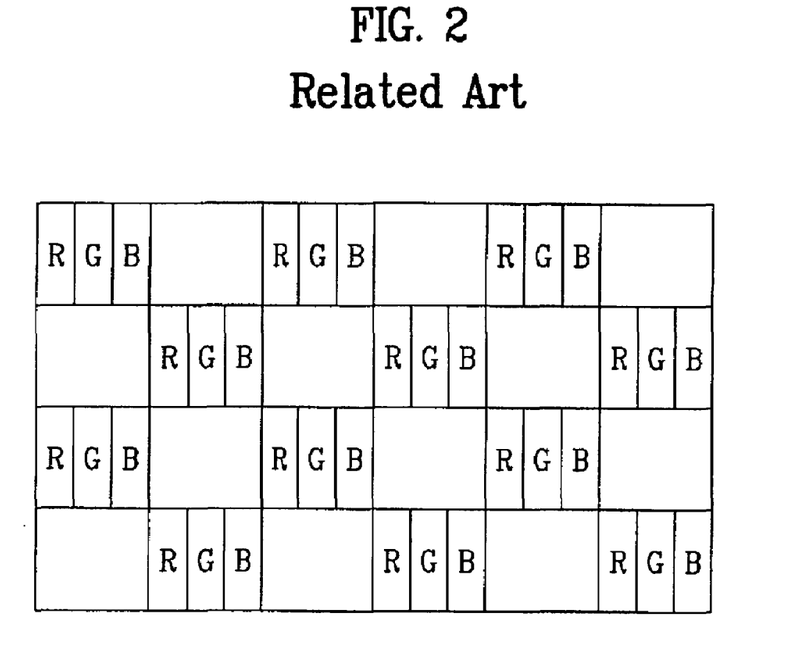
FIG. 2 is a diagram illustrating a related art LCD device driven in a counter pattern.
Figure 3:
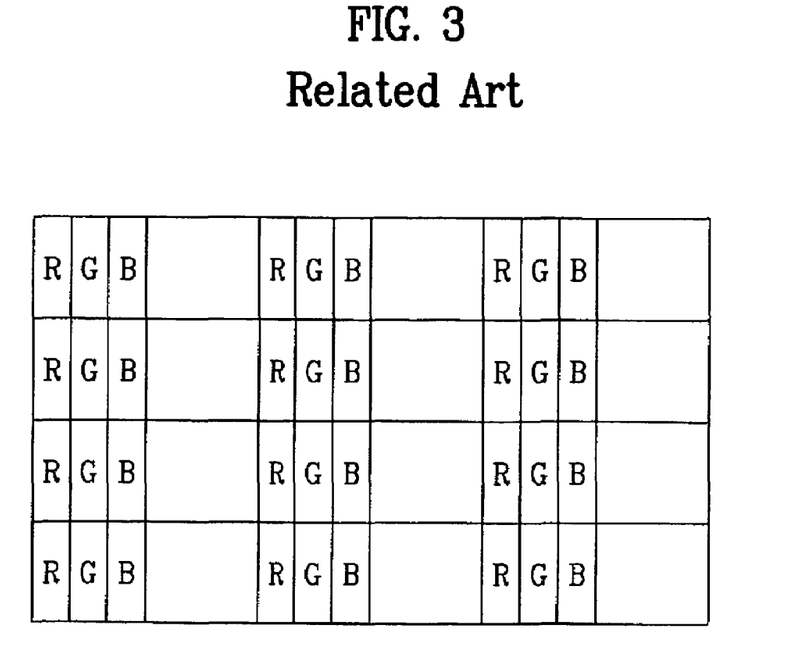
FIG. 3 is a diagram illustrating a related art LCD device driven in a vertical pattern.

The R/G/B color filter layers are arranged in various patterns, such as a stripe arrangement, a mosaic arrangement, a delta arrangement, or a quad arrangement. The R/G/B color filter layers are arranged depending on the size of an LCD panel, shape of the color filter layer, and color arrangement. The stripe arrangement, as shown in FIG. 2 and FIG. 3, has the R/G/B color filter layers arranged sequentially in a horizontal direction and the same color arranged in a vertical direction.

The related art LCD device as described above is turned on/off per each R1G/B pixels to display black (B) or white (W) to check the picture quality, such as residual images, flicker, and greenish tint. As shown in FIG. 2, the related art LCD device may be driven in a counter pattern—i.e., an Nth turned-on pixel and an N+1th turned-on pixel are horizontally shifted one space per line such that the pixels are turned on in an oblique direction. As shown in FIG. 3, the LCD device may also be driven in a vertical pattern—i.e., an Nth turned-on pixel and an N+1th turned-on pixel are arranged at the same position with each other per line such that the pixels are turned on in a vertical direction.

Figure 4A:
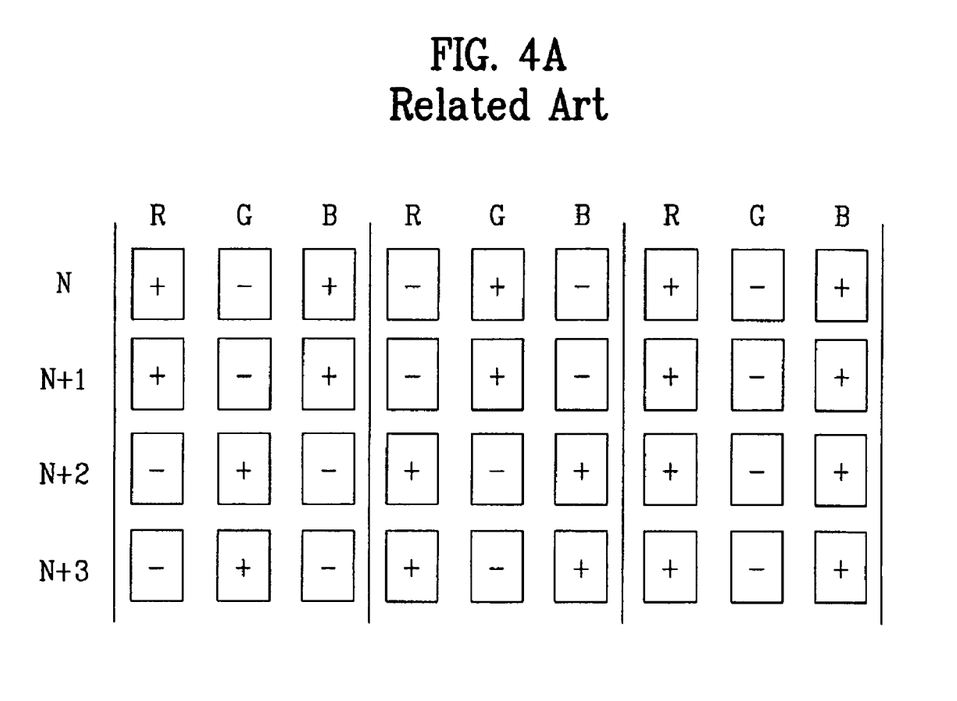
FIG. 4A is a diagram illustrating a polarity pattern of a data voltage for driving the related art LCD device in the counter pattern.
Figure 4B:
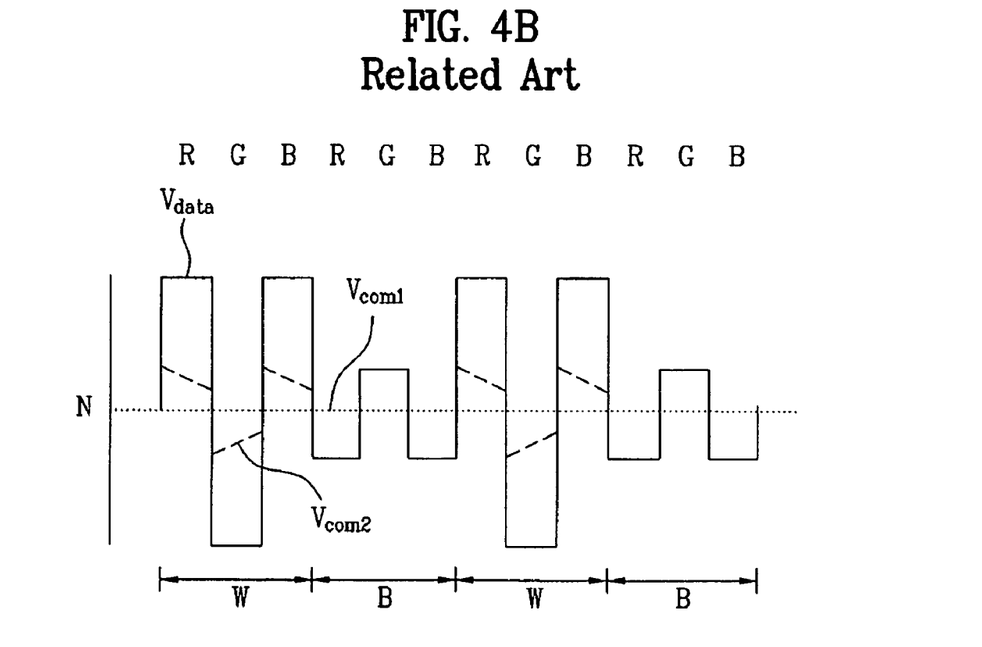
FIG. 4B is a waveform illustrating of a common voltage and a data voltage in the related art LCD device.

In the case where the LCD device is driven in the counter pattern, as shown in FIG. 4A, voltages of positive polarity (+) and negative polarity (−) are applied in a horizontal direction according to a one-dot inversion mode and the voltages are applied in a vertical direction according to a two-dot inversion mode. Specifically, a data voltage Vdata is applied to the Nth line, as shown in FIG. 4B, in such a manner that voltages of positive polarity (+) and negative polarity (−) applied using an alternating current (AC) voltage and levels of the data voltage are varied to display black and white. A common voltage Vcom1 applied to the Nth line is a direct current (DC) voltage and the liquid crystal layer is driven by the potential difference between the data voltage Vdata and the common voltage Vcom1.

However, the related art LCD device has several problems. As shown in FIG. 4B, the data voltage Vdata applied to the Nth line is an AC voltage and the common voltage Vcom applied thereto is a DC voltage. Fluctuation of the common voltage Vcom1 is amplified at a portion where the data line 12 overlaps the common line 25 due to common line capacitance Cdc formed between the data line 12 and the common line 25. For this reason, coupling occurs in which the common voltage Vcom1 becomes distorted common voltage Vcom2.

In one pixel having R/G/B sub-pixels to display white, the distorted common voltage Vcom2 of the R sub-pixel and the distorted common voltage Vcom2 of the G sub-pixel are offset by each other. However, the distorted common voltage Vcom2 of the B sub-pixel remains without offset. As a result, the total common voltage is increased by the remaining common voltage than the applied common DC voltage.

Figure 5:
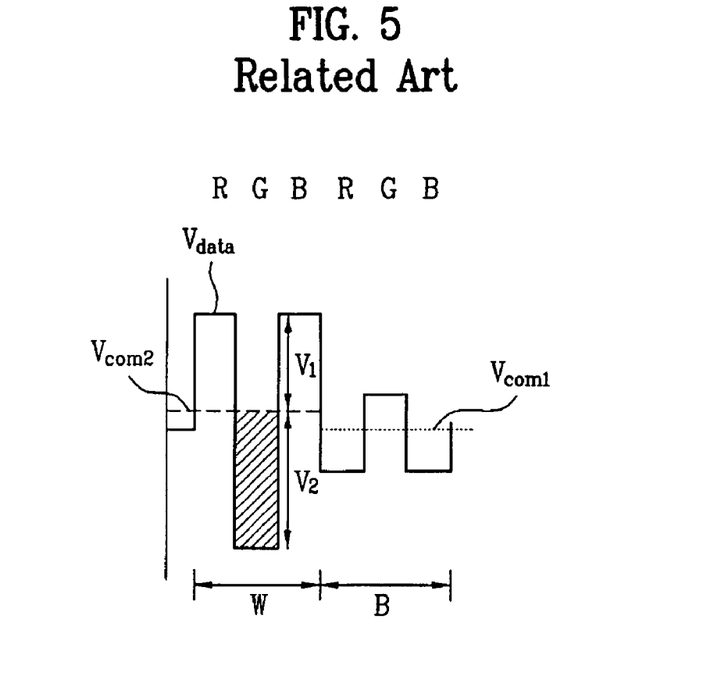
FIG. 5 and FIG. 6 are waveforms illustrating generation of a greenish tint in the related art LCD device.

As shown in FIG. 5, if the common voltage Vcom2 flowing in the common line 25 due to parasitic coupling increases the applied common DC voltage Vcom1, the voltage difference V2 between the voltages Vdata and Vcom2 applied to the green pixel region is greater than the voltage difference V1 between the voltages Vdata and Vcom2 applied to the red and blue pixel regions. The result is a greenish tint in the displayed image as the color green appears brighter than the other colors. Green appears brighter because rotation of the liquid crystal molecules increases if the voltage difference becomes larger, thereby making the corresponding color brighter.

Figure 6:
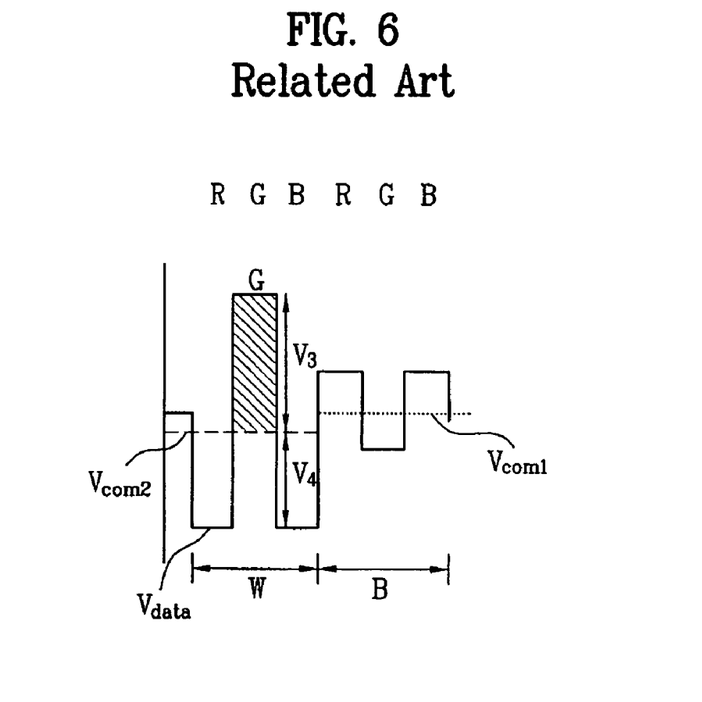

Likewise, as shown in FIG. 6, if the common voltage Vcom2 flowing in the common line due to the parasitic coupling decreases the applied common DC voltage Vcom1, the voltage difference V3 between the voltages Vdata and Vcom2 applied to the green pixel region is greater than the voltage difference V4 between the voltages Vdata and Vcom2 applied to the red and blue pixel regions. Accordingly, a greenish tint results because the color green is brighter than the other colors. Furthermore, since the liquid crystal molecules are rotated unstably due to distortion of the common voltage Vcom, residual images corresponding to previous images are generated during conversion of images. Flicker of the images is also generated, which deteriorates picture quality.

SUMMARY OF THE INVENTION

Accordingly, the present invention is directed to an LCD device that substantially obviates one or more problems due to limitations and disadvantages of the related art.

An object of the present invention is to provide an LCD device in which common voltages are offset such that residual image, flicker, and greenish tint are eliminated.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes a first substrate, gate lines formed on the first substrate, data lines perpendicularly crossing the gate lines to define red, green, and blue (R/G/B) sub-pixels, thin film transistors (TFTs) disposed at each intersection where the gate lines cross the data lines, common lines disposed in parallel with the gate lines, the common lines including a common line capacitance (Cdc) control portion, pixel electrodes insulated from the common lines and connected to the TFTs, a second substrate opposite to the first substrate and bonded to the first substrate, and a liquid crystal layer disposed between the first and second substrates.

In another aspect, a method of fabricating a liquid crystal display (LCD) device includes forming gate lines on a first substrate, the gate lines including a gate line capacitance (Cdg) control portion, forming common lines on the first substrate in parallel with the gate lines, the common lines including a common line capacitance (Cdc) control portion, forming an insulating layer over the gate lines and the common lines, forming data lines on the insulating layer perpendicularly crossing the gate lines to define red, green, and blue (R/G/B) sub-pixels, forming thin film transistors (TFTs) at each intersection where the gate lines cross the data lines, forming pixel electrodes connected to the TFTs, and attaching a second substrate onto the first substrate with a liquid crystal layer disposed therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 7:
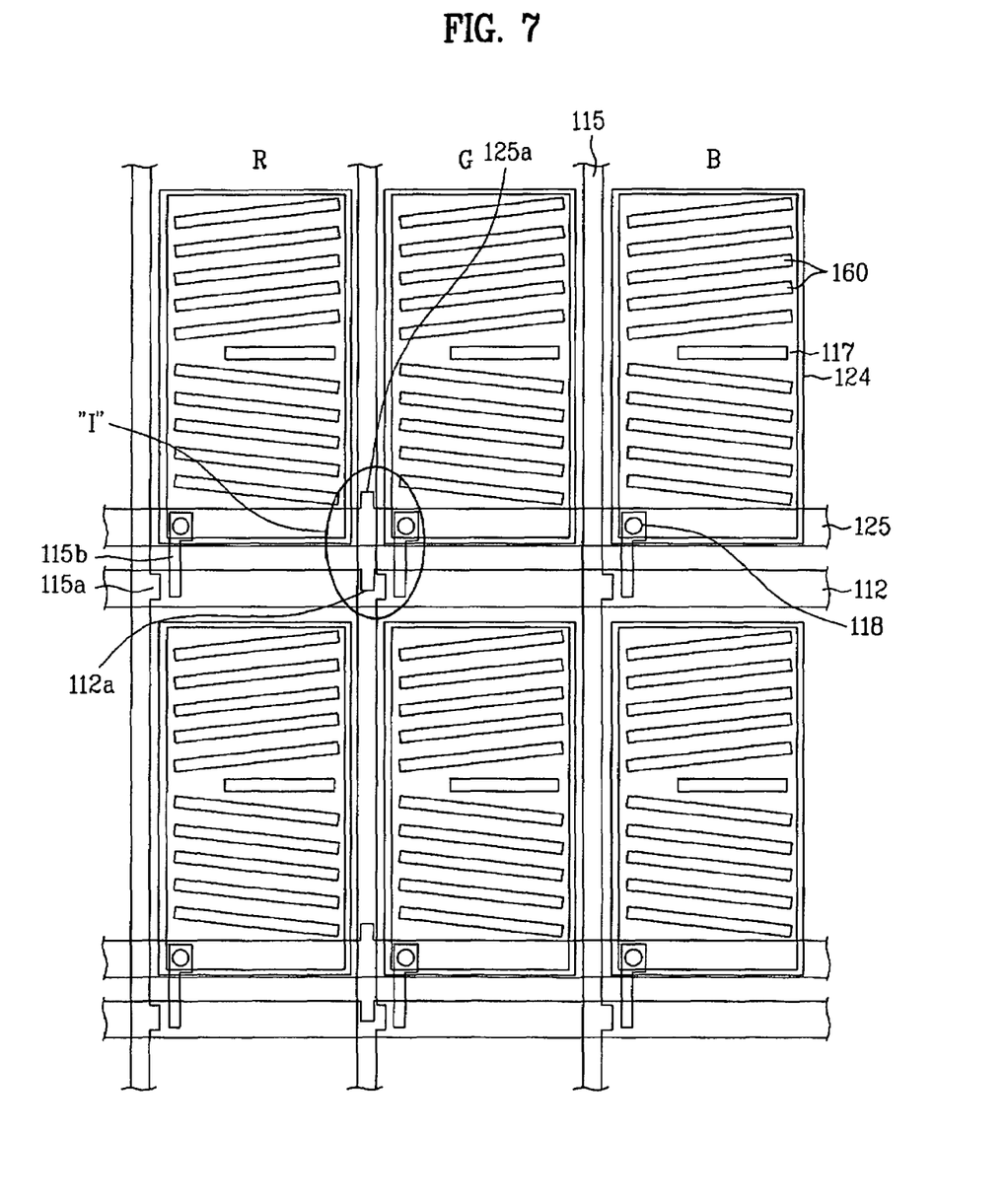
FIG. 7 is a plane view illustrating an FFS mode LCD device according to a first exemplary embodiment of the present invention.

FIG. 7 shows a plane view illustrating a fringe field switching (FFS) mode liquid crystal display (LCD) device according to a first exemplary embodiment of the present invention. As shown in FIG. 7, a thin film transistor (TFT) array substrate of an FFS mode LCD device according to the first exemplary embodiment of the present invention includes gate lines 112, data lines 115, TFTs at each intersection of the gate lines 112 and data lines 115, common lines 125, plate type counter electrodes 124, and pixel electrodes 117. The gate lines 112 perpendicularly cross the data lines 115 to define pixels. The gate lines 112 are insulated from the data lines 115 by a gate insulating layer (not shown). Each of the TFTs is arranged at each crossing point between the respective gate and data lines 112 and 115.

According to the first exemplary embodiment of the present invention, each common line 125 is provided with an extension 125a that serves to control a common line capacitance Cdc (i.e., capacitance generated by the overlap of the data line 115 and the common line 125) and is arranged at an overlap portion I with the data line 115 in a G sub-pixel. The extension 125a of the common line 125 is flush with the data line 115. The counter electrodes 124 contact the common lines 125 and are formed inside the respective pixel. The pixel electrode 117 is connected to a drain electrode 115b of the TFT through a contact hole 118 and has a plurality of slits 160. The pixel electrode 117 is insulated from the counter electrode 124. If voltages are applied to the pixel electrodes 117 and the counter electrodes 124, a fringe field is formed through the slit 160 between the pixel electrode 117 and the counter electrode 124 so that liquid crystal molecules are driven with maximum efficiency.

The extension 125a of the common line 125 is not formed in R and B sub-pixels but formed only in the G sub-pixel so that the common line capacitance Cdc of the G sub-pixel is different from that of the R and B sub-pixels. Generally, a capacitor is made of upper and lower electrodes with an insulating layer interposed therebetween. Capacitance of a capacitor increases as an area of the upper and lower electrodes increases. The capacitance decreases as the thickness of the insulating layer increases. Therefore, the extension 125a in the G sub-pixel increases the overlap area of the data line 115 and the common line 125, thereby increasing the common line capacitance Cdc of the G sub-pixel.

Supposing that an overlap area between the common line 125 and the data line 115 is S, an extension area 125a of the common line 125 overlapped with the data line 115 is S', the thickness of the gate insulating layer interposed between the common line 125 and the data line 115 is d, and a dielectric ratio of the gate insulating layer is $\in$, the common line capacitance Cdc can be expressed as follows:

$$Cdc = \varepsilon \frac{S+S'}{d} = \varepsilon \frac{S}{d} + \varepsilon \frac{S'}{d}. \quad \text{(Equation 1)}$$

Therefore, the common line capacitance Cdc is increased by as much as $$\varepsilon \frac{S'}{d}$$

in the G sub-pixel by the extension 125a of the common line 125.

The common line capacitance Cdc of the G sub-pixel is increased to vary from the common line capacitance Cdc of the R and B sub-pixels. Thus, a distorted common voltage of the R and B sub-pixels and a distorted common voltage of the G sub-pixel offset each other so that the effective common voltage applied to the R/G/B sub-pixels are uniform.

However, an increase in the common line capacitance Cdc also increases delay of the data voltage flowing along the data line 115. Therefore, a recess 112a is formed in an area of the gate line 112 overlapped by the data line 115 that also overlaps the extension 125a. The recess 112a lowers a gate line capacitance Cdg (i.e., capacitance in an overlap portion between the data line 115 and the gate line 112) to offset the increased common line capacitance Cdc by the extension 125a.

Supposing that an overlap area between the gate line 112 and the data line 115 is W, a recess area of the gate line 112 overlapped with the data line 115 is W', the thickness of the gate insulating layer interposed between the gate line 112 and the data line 115 is d, and a dielectric ratio of the gate insulating layer is $\in$, the gate line capacitance Cdg can be expressed as follows:

$$Cdg = \varepsilon \frac{W-W'}{d} = \varepsilon \frac{W}{d} - \varepsilon \frac{W'}{d}. \quad \text{(Equation 2)}$$

Therefore, the gate line capacitance Cdg is decreased by as much as $$\varepsilon \frac{W'}{d}$$

in the G sub-pixel by the recess 112a of the gate line 112.

According to the present invention, the common line capacitance Cdc of the G sub-pixel is increased to prevent greenish tint from being generated by the G sub-pixel, and the gate line capacitance Cdg of the G sub-pixel is decreased by the same amount as the increased common line capacitance Cdc to prevent delay of the data voltage. If the voltage applied to the gate line 112 is the same as that of the voltage applied to the common line 125, the common line capacitance Cdc is equal to the gate line capacitance Cdg if the following condition is met:

$$\varepsilon \frac{S'}{d} = \varepsilon \frac{W'}{d}. \quad \text{(Equation 3)}$$

If the gate insulating layer is formed uniformly over the entire substrate, the thickness d of the gate insulating layer and its dielectric ratio $\in$ are uniform over the entire substrate (i.e., d and $\in$ are equal on either side of the equation 3). Thus, according to equation 3, by forming the extension 125a and the recess 112a having the same area (i.e., S'=W'), the increase of the common line capacitance Cdc in the G sub-pixel is offset by the decrease of the gate line capacitance Cdg.

Figure 8:
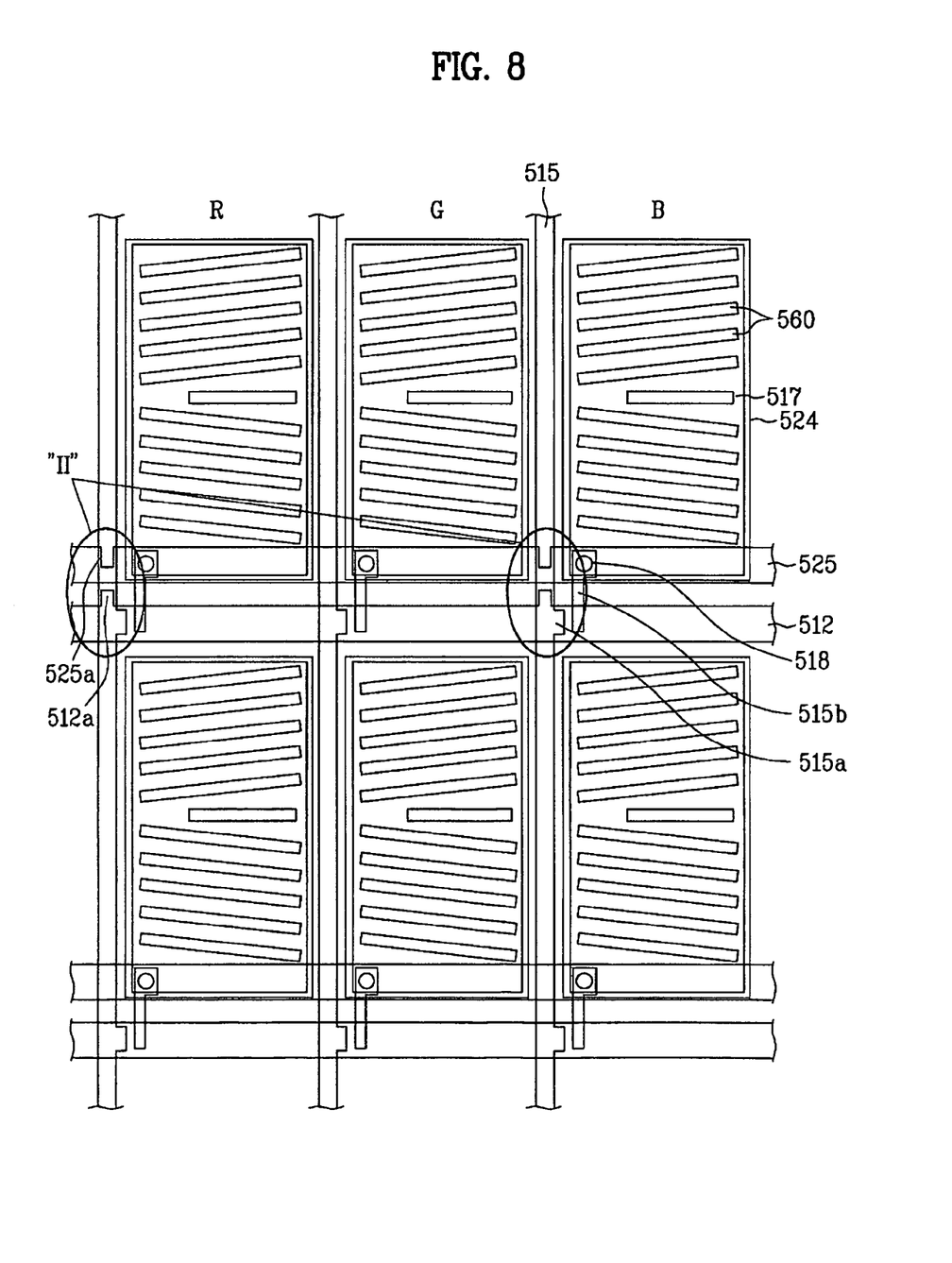
FIG. 8 is a plane view illustrating an FFS mode LCD device according to a second exemplary embodiment of the present invention.

FIG. 8 shows a plane view illustrating an FFS mode LCD device according to a second exemplary embodiment of the present invention. As shown in FIG. 8, a TFT array substrate includes gate lines 512, data lines 515, TFTs formed at each intersection of the gate lines 512 and data lines 515, common lines 525, plate type counter electrodes 524, and pixel electrodes 517. The gate lines 512 perpendicularly cross the data lines 515 to define pixels. The gate lines 512 are insulated from the data lines 515 by gate insulating layers (not shown). Each of the TFTs is arranged at each crossing point between the respective gate and data lines 512 and 515.

According to the second exemplary embodiment of the present invention, the common line 525 is provided with a recess 525a that serves to control the common line capacitance Cdc (i.e., capacitance generated by the overlap of the data line 515 and the common line 525) and is arranged at an overlap portion II with the data line 515 in R and B sub-pixels. The recess 525a of the common line 525 is flush with the data line 515. The counter electrode 524 contacts the common lines 525 and is formed inside the respective pixel. The pixel electrode 517 is connected to a drain electrode 515b of the TFT through a contact hole 518 and has a plurality of slits 560. The pixel electrode 517 is insulated from the counter electrode 524. If voltages are applied to the pixel electrode 517 and the counter electrode 524, a fringe field is formed through the slit 560 between the pixel electrode 517 and the counter electrode 524 so that liquid crystal molecules are driven with maximum efficiency.

The recess 525a of the common line 525 is not formed in the G sub-pixel but formed in the R and B sub-pixels so that the common line capacitance Cdc of the G sub-pixel varies from the common line capacitance Cdc of the R and B sub-pixels. In particular, the recess 525a in the R and B sub-pixels decreases the overlap area between the common line 525 and the data line 515, thereby decreasing the common line capacitance Cdc of the R and B sub-pixels.

Supposing that an overlap area between the common line 525 and the data line 515 is S, a recess area 525a of the common line 525 overlapped with the data line 515 is S', the thickness of the gate insulating layer interposed between the common line 525 and the data line 515 is d, and a dielectric ratio of the gate insulating layer is $\in$, the common line capacitance Cdc of the R and B sub-pixels can be expressed as follows:

$$Cdc = \varepsilon \frac{S - S'}{d} = \varepsilon \frac{S}{d} - \varepsilon \frac{S'}{d}. \quad \text{(Equation 4)}$$

Therefore, the common line capacitance Cdc is decreased by as much as $$\varepsilon \frac{S'}{d}$$

in each of the R and B sub-pixels by the recess 525a of the common line 525. Accordingly, the overall common line capacitance Cdc is decreased by as much as $$2\varepsilon \frac{S'}{d}$$

for one pixel.

The common line capacitance Cdc of the R and B sub-pixels is decreased to vary from that of the G sub-pixel. Thus, a distorted common voltage of the R and B sub-pixels and a distorted common voltage of the G sub-pixel offset each other so that the effective common voltage applied to the R/G/B sub-pixels are uniform.

However, because the common line capacitance Cdc affects traveling speed of the data voltage, the decrease of the common line capacitance Cdc in the R and B sub-pixels causes non-uniform transmission of the data voltages flowing along the data lines 515 supplied to the R/G/B sub-pixels. Therefore, to compensate for the variance of the common line capacitance Cdc among the R/G/B/sub-pixels, an extension 512a is formed in an area of the gate line 512 overlapped by the data line 515 that also overlaps the recess 525. The extension 512a increases the gate line capacitance Cdg (i.e., capacitance in an overlap portion between the data line 515 and the gate line 512) to offset the decreased common line capacitance Cdc by the recess 525a.

Supposing that an overlap area between the gate line 512 and the data line 515 in the R and G sub-pixels is W, an extension area 512a of the gate line 512 overlapped with the data line 515 is W', the thickness of the gate insulating layer interposed between the gate line and the data line is d, and a dielectric ratio of the gate insulating layer is $\in$, the gate line capacitance Cdg can be expressed as follows:

$$Cdg = \varepsilon \frac{W + W'}{d} = \varepsilon \frac{W}{d} + \varepsilon \frac{W'}{d}. \quad \text{(Equation 5)}$$

Therefore, the gate line capacitance Cdg is increased by as much as $$\varepsilon \frac{W'}{d}$$

in the R and B sub-pixels by the extension 512a of the gate line 512. Accordingly, the overall gate line capacitance Cdg is increased by as much as $$2\varepsilon \frac{W'}{d}$$

for one pixel.

The common line capacitance Cdc of the R and B sub-pixels is decreased to prevent generation of a greenish tint in the images by of the G sub-pixel, and the gate line capacitance Cdg of the R and B sub-pixels is increased by the same amount of the decreased common line capacitance Cdc to allow uniform flow the data voltages to the R/G/B sub-pixels. If the voltage applied to the gate line 512 is the same as that of the voltage applied to the common line 525, the common line capacitance Cdc is equal to the gate line capacitance Cdg if the condition according to equation 3 is met.

If the gate insulating layer is formed uniformly over the entire substrate, the thickness d of the gate insulating layer and its dielectric ratio $\in$ are uniform over the entire substrate (i.e., d and $\in$ are equal on either side of the equation 3). Accordingly, by forming the recess 525a and the extension 512a having the same area (i.e., S'=W'), the decrease of the common line capacitance Cdc in the R and G sub-pixels is offset by the increase of the gate line capacitance Cdg.

The slits 160 and 560 in the first and second exemplary embodiments are formed symmetrically around a center portion of the pixel so that liquid crystal directors are aligned in different directions, thereby obtaining a multi-domain. Further, the TFT formed at each crossing point between the gate lines 112 and 512 and the data lines 115 and 515 to control the switching of the data voltage includes a gate electrode corresponding to a predetermined region of the gate line, a gate insulating layer (not shown) formed on an entire surface including the gate lines 112 and 512, a semiconductor layer (not shown) formed by sequentially depositing amorphous silicon (a-Si) on the gate insulating layer on the gate electrode and n+a-Si implanted with impurity ions on the amorphous silicon, and source/drain electrodes 115a/115b and 515a/515b forked from the data lines 115 and 515 and formed on the semiconductor layer. Moreover, the TFT array substrate is bonded to the opposing color substrate with a liquid crystal layer therebetween, wherein the opposing color substrate includes a black matrix layer and color filter layers.

The above-described exemplary embodiments were described in relation to an FFS mode LCD device. However, the present invention is not limited to the FFS mode LCD device and may be applied to other types of LCD devices. Examples of various modes applicable to the present invention include a twisted nematic (TN) mode in which liquid crystal directors are arranged at a twisted angle of 90° and voltages are applied thereto to control the liquid crystal directors, a multi-domain mode in which one pixel is divided into a plurality of domains and main viewing angles of the respective domains vary from one another to obtain a wide viewing angle, an optically compensated birefringence (OCB) mode in which a compensation film is attached to an outer surface of a substrate to compensate phase variation of light depending on a progress direction of the light, an in-plane switching (IPS) mode in which two electrodes are formed on one substrate and liquid crystal directors are twisted in parallel with an alignment film, and a vertical alignment (VA) mode in which liquid crystal molecules are vertically arranged on an alignment film using a negative liquid crystal and a vertical alignment film. For reference, instead of providing the counter electrode on the TFT array substrate, the counter electrode may be formed on the color filter array substrate depending on the above mode.

According to the present invention, to prevent the greenish tint from occurring, the common line capacitance Cdc of the G sub-pixel is varied from the common line capacitance Cdc of the R and B sub-pixels by modifying a pattern of the overlap portion between the common line and the data line. Further, a pattern of the overlap portion between the gate line and the data line is modified to compensate for the increase or decrease in the modified common line capacitance Cdc.

The LCD device according to the present invention has the following advantages. First, the pattern of the overlap portions between the common line and the data line is modified so that the common line capacitance Cdc of the G sub-pixel varies from the common line capacitance Cdc of the R and B sub-pixels, thereby fully offsetting the distorted common voltages in white color. Therefore, the greenish tint is prevented, thereby improving picture quality. In addition, the pattern of the overlap portion between the gate line and the data line is modified to compensate for the increased or decreased common line capacitance Cdc in each sub-pixel, thereby preventing the data signal in each sub-pixel from being delayed.

It will be apparent to those skilled in the art that various modifications and variations can be made in the LCD device of the present invention without departing form the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a first substrate;
gate lines formed on the first substrate;
data lines perpendicularly crossing the gate lines to define red, green, and blue (R/G/B) sub-pixels;
thin film transistors (TFTs) disposed at each intersection where the gate lines cross the data lines;
common lines disposed in parallel with the gate lines;
pixel electrodes insulated from the common lines and connected to the TFTs;
a second substrate opposite to the first substrate and bonded to the first substrate; and
a liquid crystal layer disposed between the first and second substrates, and
wherein an extension is formed on each of the common lines overlapped with the data lines in the G sub-pixels,
wherein a recess is formed on each of the gate lines overlapped with the data lines in the G sub-pixels,
wherein an area of the extension is equal to an area of the recess.

2. The LCD device according to claim 1, further including counter electrodes that contact the common lines, wherein an electric field is formed between each counter electrode and each pixel electrode.

3. A method of fabricating a liquid crystal display (LCD) device, comprising:
forming gate lines on a first substrate;
forming common lines on the first substrate in parallel with the gate lines;
forming an insulating layer over the gate lines and the common lines;
forming data lines on the insulating layer perpendicularly crossing the gate lines to define red, green, and blue (R/G/B) sub-pixels;
forming thin film transistors (TFTs) at each intersection where the gate lines cross the data lines;
forming pixel electrodes connected to the TFTs; and
attaching a second substrate onto the first substrate with a liquid crystal layer disposed therebetween, and
wherein an extension is formed on each of the common lines overlapped with the data lines in the G sub-pixels,
wherein a recess is formed on each of the gate lines overlapped with the data lines in the G sub-pixels,
wherein an area of the extension is equal to an area of the recess.

* * * * *